US 9,063,649 B2
(12) United States Patent
Kim

(10) Patent No.: US 9,063,649 B2
(45) Date of Patent: Jun. 23, 2015

(54) MOBILE TERMINAL AND CONTROLLING METHOD THEREOF

(75) Inventor: Minwoo Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/090,399

(22) Filed: Apr. 20, 2011

(65) Prior Publication Data

US 2012/0052917 A1  Mar. 1, 2012

(30) Foreign Application Priority Data

Aug. 31, 2010 (KR) ........................ 10-2010-0084648

(51) Int. Cl.
*G06F 3/043* (2006.01)
*G06F 3/14* (2006.01)
*G06F 3/0488* (2013.01)
*G06F 3/0481* (2013.01)

(52) U.S. Cl.
CPC ........ *G06F 3/04883* (2013.01); *G06F 3/04815* (2013.01)

(58) Field of Classification Search
USPC .................. 455/566; 715/848, 850, 852, 864
See application file for complete search history.

(56) References Cited

U.S. PATENT DOCUMENTS

| 6,243,054 B1 | 6/2001 | DeLuca |
| 6,559,813 B1 | 5/2003 | DeLuca |
| 2005/0034084 A1* | 2/2005 | Ohtsuki et al. ................ 715/864 |
| 2008/0094398 A1* | 4/2008 | Ng et al. ........................ 345/427 |
| 2008/0261660 A1* | 10/2008 | Huh et al. ...................... 455/566 |
| 2008/0312942 A1* | 12/2008 | Katta et al. ......................... 705/1 |
| 2009/0058829 A1* | 3/2009 | Kim et al. ...................... 345/173 |
| 2009/0183930 A1* | 7/2009 | Yang et al. .................. 178/18.03 |

FOREIGN PATENT DOCUMENTS

| CN | 101587419 | 11/2009 |
| KR | CN 101379641 A | 3/2009 |

OTHER PUBLICATIONS

Chinese Office Action dated Dec. 31, 2012 for Application 201110182493.1 and English translation.
Chinese Office Action dated Aug. 29, 2013 for corresponding Application No. 201110182493.1.

* cited by examiner

*Primary Examiner* — Rafael Pérez-Gutiérrez
*Assistant Examiner* — Joshua Schwartz
(74) *Attorney, Agent, or Firm* — KED & Associates LLP

(57) ABSTRACT

A mobile terminal and controlling method thereof are disclosed. The present invention includes displaying a 3D user interface including at least one 3D object on a display unit, selecting at least one stereoscopic region from the 3D user interface by a first input via a user input unit, displaying at least one polyhedron corresponding to each of the selected at least one region on the display unit, and changing a display state of each of the at least one polyhedron to correspond to a second input via the user input unit, wherein the step of changing the display state is performed to enlarge, reduce, rotate or scroll the at least one polyhedron according to the second input. Accordingly, the present invention provides a 3D user interface using a 3D object arranged in a virtual 3D space, thereby facilitating a user to manipulate a mobile terminal with a new visual effect.

20 Claims, 16 Drawing Sheets

(a)

(b)

(a)

(b)　　　　　　　　　　(c)

(a)

(b)

(c)

(d)

(a)

(b)

(a)

(b)

(a)

(b)

(a)

(b)

(c)

(d)

(a)

(b)

(a)

(b)

(c)

MOBILE TERMINAL AND CONTROLLING METHOD THEREOF

CROSS-REFERENCE TO RELATED APPLICATION

This application claims priority from Korean Application No. 10-2010-0084648, filed Aug. 31, 2010, the subject matter of which is incorporated herein by reference.

BACKGROUND

1. Field

The present invention relates to a mobile terminal, and more particularly, to a mobile terminal and controlling method thereof. Although the present invention is suitable for a wide scope of applications, it is particularly suitable for providing functions of enlargement, reduction and rotation to a 3D user interface 3D user interface.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, as various 3-dimensional (hereinafter abbreviated 3D) user interfaces can be implemented on a display unit of a terminal using 3D objects, the demands for manipulating methods convenient for performing a display form change (e.g., enlargement, reduction, rotation, etc.) of a 3D user interface are ongoing to rise.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
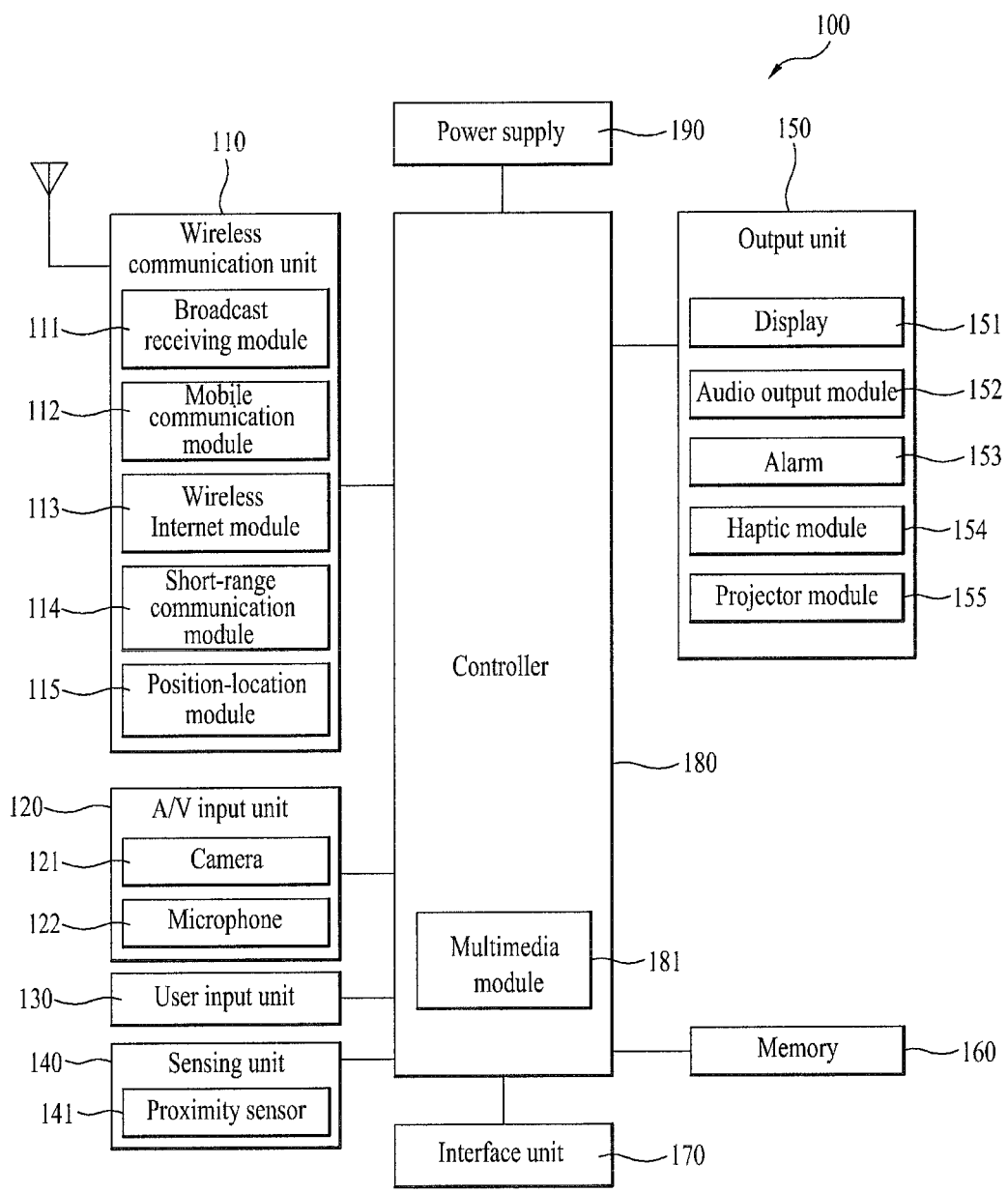
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (NV) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
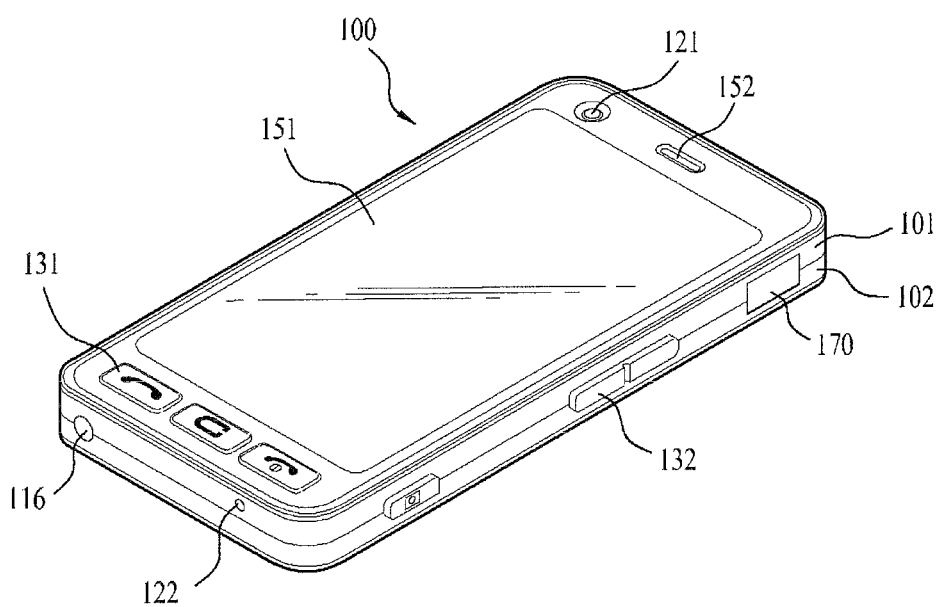
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
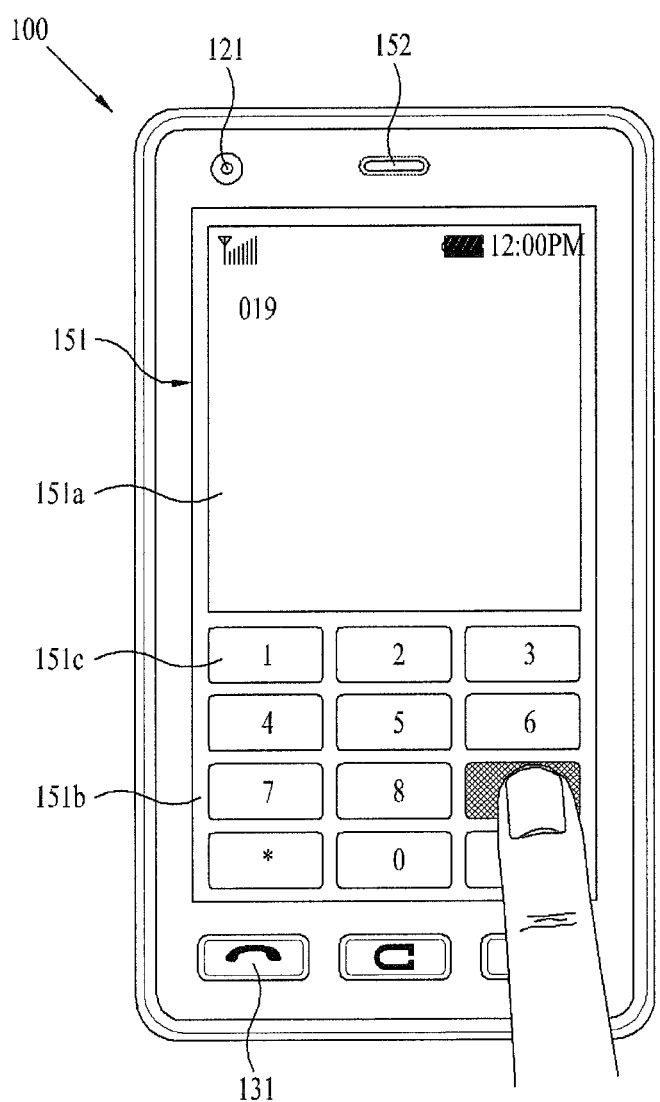
FIG. 3 is a front diagram of a mobile terminal according to one embodiment of the present invention to describe one operative status thereof.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

In the following description, a method of displaying a 3D image in a mobile terminal applicable to embodiments of the present invention and a display unit configuration for the same are explained.

First of all, 3D images implemented on the display unit 151 of the mobile terminal 100 according to can be mainly classified into two kinds of categories. In this case, the reference for this classification is attributed to whether different images are provided to both eyes, respectively.

The first 3D image category is described as follows.

First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a stereoscopic image can substantially include a planar image.

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 4 as follows.

Figure 4:
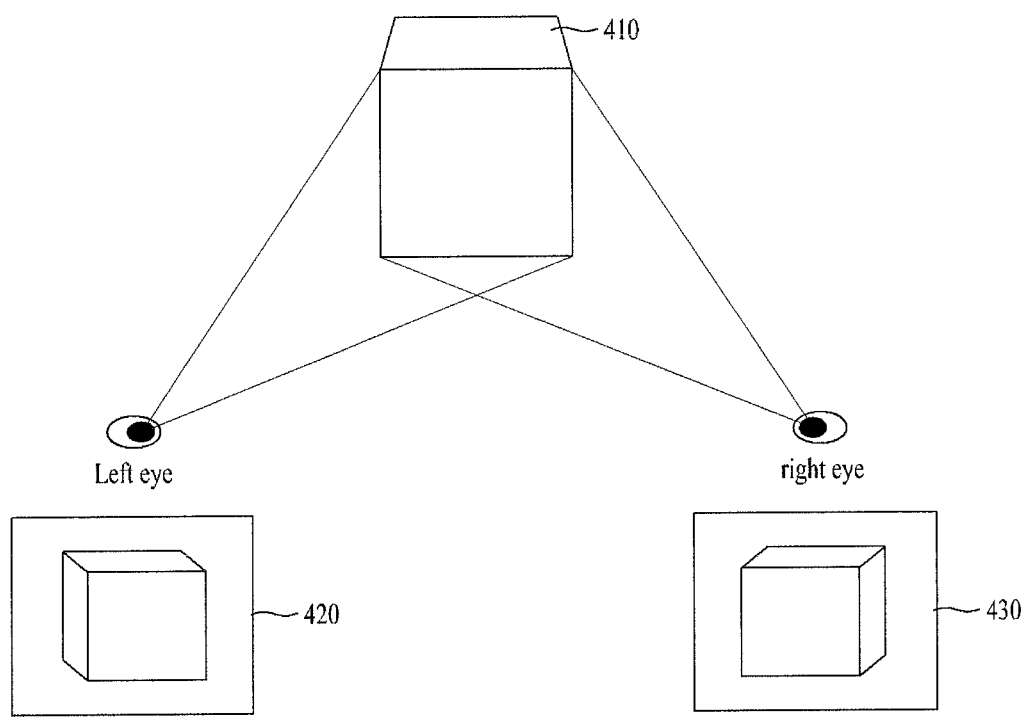
FIG. 4 is a diagram for describing the principle of binocular disparity.

FIG. 4 is a diagram for explaining the principle of binocular disparity.

Referring to FIG. 4, assume a situation that a hexahedron 410 is positioned as a subject in front below an eye's height to be seen through human eyes. In this case, a left eye is able to see a left eye planar image 420 revealing three facets including a top side, a front side and a left lateral side of the hexahedron 410 only. And, a right eye is able to see a right eye planar image 430 revealing three facets including the top side, the front side and a right lateral side of the hexahedron 410 only.

Even if a real thing is not actually positioned in front of both eyes of a user, if the left eye planar image 420 and the right eye planar image 430 are set to arrive at the left eye and the right eye, respectively, a user is able to substantially sense the hexahedron 410 as if looking at the hexahedron 31 actually.

Thus, in order to implement the 3D image belonging to the second category in the mobile terminal 100, images of the same object should arrive at both eyes in a manner of being discriminated from each other for the left and right eye images of the same object with a predetermined parallax.

In order to discriminate the above-mentioned two categories from each other in this disclosure, a stereoscopic image belonging to the first category shall be named 'monoscopic 3D image' and a stereoscopic image belonging to the second category shall be named '3D stereoscopic image'.

A method of implementing a 3D stereoscopic image is described as follows.

First of all, as mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes.

A structure of a parallax barrier type display unit 151 for displaying a 3D image can be configured in a manner that a general display device is combined with a switch LC (liquid crystals). A propagating direction of light is controlled by activating an optical parallax barrier provided to the switch LC, whereby the light is separated into two different lights to arrive at left and right eyes, respectively. Thus, when an image generated from combining an image for the right eye and an image for the left eye together is displayed on the display device, a user sees the images corresponding to the eyes, respectively, thereby feeling the 3D or stereoscopic effect.

Alternatively, the parallax barrier is electrically controlled to enable entire light to be transmitted therethrough, whereby the light separation due to the parallax barrier is avoided. Therefore, the same image can be seen through left and right eyes. In this case, the same function of a conventional display unit is available.

Meanwhile, the parallax barrier provides a 3D stereoscopic image with reference to one axis. Yet, the present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

For clarity of description, a mobile terminal mentioned in the following description is assumed as including at least one of the components shown in FIG. 1. In particular, a mobile terminal according to the present invention includes a display unit capable of displaying a 3D user interface including a 3D object by at least one method among the above-mentioned monoscopic 3D image and 3D stereoscopic image implementing schemes. In this case, the 3D object means a polyhedron generated from combining at least one of dots, lines, surfaces or combination thereof in a manner of having a prescribed 3D depth in a virtual stereoscopic space. And, the 3D user interface means a graphic user interface (GUI) including at least one 3D object. Therefore, in case that a 3D user interface is implemented into a monoscopic 3D image, it means that a user is provided with a planar image generated from seeing the 3D user interface including a 3D object in a specific view. In case that a 3D user interface is implemented into a 3D stereoscopic image, it means that left and right eye images generated from seeing the 3D user interface in a specific view are provided to arrive at corresponding eyes of a user, respectively.

Display State Change of 3D User Interface

A mobile terminal and controlling method thereof according to one embodiment of the present invention are provided. In particular, according to one embodiment of the present invention, when a 3D user interface including at least one 3D object in a virtual stereoscopic space is displayed on a display unit, if at least one partial region of the 3D user interface is selected, a display state of the selected region can be changed according to a user input.

Figure 5:
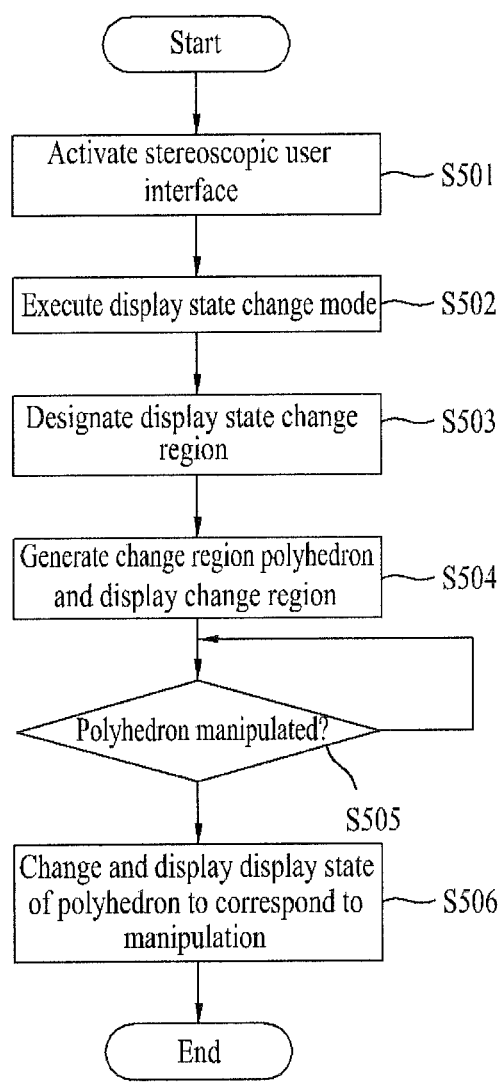
FIG. 5 is a flowchart for one example of a method of controlling a 3D user interface implemented in a mobile terminal according to one embodiment of the present invention.

FIG. 5 is a flowchart for one example of a method of controlling a 3D user interface implemented in a mobile terminal according to one embodiment of the present invention.

Referring to FIG. 5, a 3D user interface can be activated on the display unit 151 by means of a prescribed command input through the user input unit 130 or an application executed as default simultaneously with a power application [S501].

In this case, the present invention is non-limited by a type and form of a 3D user interface. For instance, a 3D user interface can correspond to one method for displaying a main menu displayed on a wallpaper in a mobile terminal or can include a user interface provided by an augmented reality application.

Subsequently, a display state change mode can be executed if a user performs a prescribed menu manipulation through the user input unit [S502]. Alternatively, the display state change mode can be executed as default according to a setting of a corresponding user interface [S502].

In this case, the display state change mode means a mode that a displayed state of at least one portion of a 3D user interface can be changed to correspond to a user's command input.

Once the display state change mode is executed, it is able to designate a display state change region corresponding to a region for changing a state on the 3D user interface by means of a user's input [S503].

In this case, the display state change region becomes at least one partial space of a virtual space displayed on a 3D user interface. In order to designate such a space, if one facet of a polyhedron enclosing the corresponding space is first selected, it is able to use a method of forming a polygonal pillar in prescribed height with a base side set to the selected facet. Alternatively, it is able to use a method for a user to directly designate a height of the polygonal pillar through a prescribed input. A detailed implementation of designating the present region shall be explained later.

Once the display sate change region is designated, a polyhedron of a prescribed shape including the corresponding region, i.e., a change region polyhedron is generated. And, the generated change region polyhedron can be displayed with a prescribed visual effect [S504].

In doing so, the change region polyhedron is enlarged or reduced at a prescribed ratio to be greater or smaller than the selected display state change region. The enlarged/reduced change region polyhedron is displayed as an OSD (on screen display) by being overlaid on the 3D user interface or can be displayed on a separate region or window.

Moreover, the change region polyhedron can be displayed as a 3D stereoscopic image. In this case, the change region polyhedron can be displayed as the 3D stereoscopic image only. Alternatively, a whole display can be displayed as a 3D stereoscopic image as soon as the change region polyhedron is displayed. For this, the controller 180 is able to give a different 3D depth to each of the change region polyhedron and a 3D user interface except the change region polyhedron. Consequently, a user is able to feel the change region polyhedron as if the change region polyhedron is located closer to the user than the rest of the 3D user interface except the change region polyhedron (i.e., as if the change region polyhedron seems to float.

If the change region polyhedron is displayed, the user is able to input a command for shifting(scrolling)/enlarging/reducing the polyhedron via a prescribed menu manipulation or a touchscreen provided to the mobile terminal [S505].

If such a command is inputted, a display state of the polyhedron is changed. The changed display state can be then displayed on the display unit [S506].

One change region polyhedron is selected in the description with reference to FIG. 5, by which the present invention is non-limited. For instance, a plurality of change region polyhedrons can be selected. If so, a user is able to change a display state of each of a plurality of the change region polyhedrons by manipulating the corresponding change region polyhedron selectively.

In the following description, a method of changing a display state of a 3D user interface according to one embodiment of the present invention is explained in detail using a detailed form of the 3D user interface.

Figure 6:
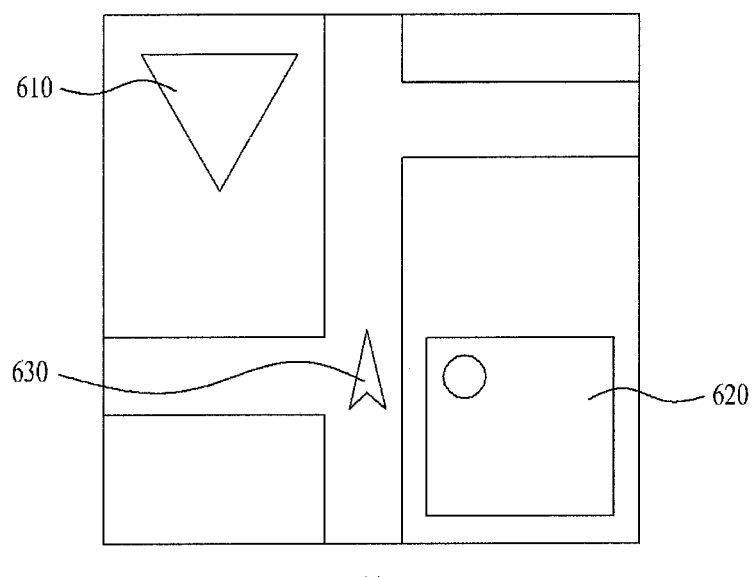
FIG. 6 is a diagram for one example of a display form of a 3D user interface implemented in a mobile terminal according to one embodiment of the present invention.
Figure 6:
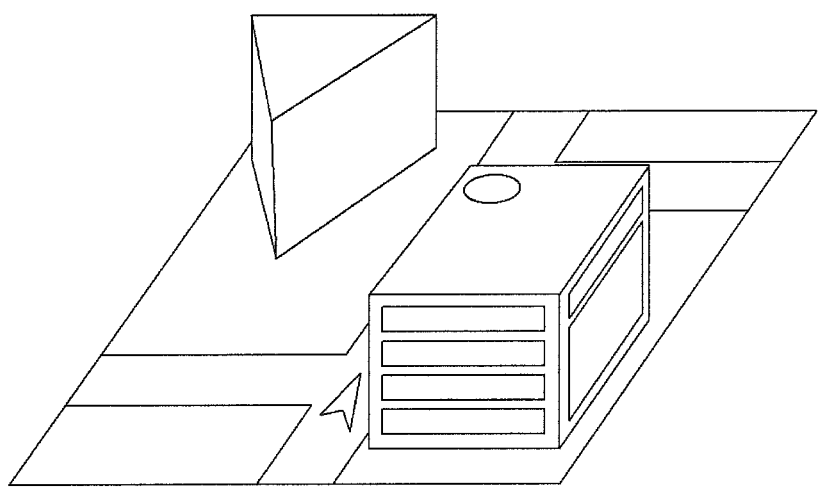

FIG. 6 is a diagram for one example of a display form of a 3D user interface implemented in a mobile terminal according to one embodiment of the present invention.

Referring to FIG. 6, assume that a 3D user interface is provided via an application for informing a user of perimeter location information. In particular, as a perimeter location information related application is executed on the display unit, a triangular pillar type building 610, a rectangular pillar type building 620 and a user's current position 630 can be displayed on a 2D map [FIG. 6 (*a*)]. In this case, as the user changes the 2D map into a 3D form via a prescribed menu manipulation, a 3D map representing each of the buildings as a 3D object can be displayed via a 3D user interface [FIG. 6 (*b*)].

In the following description, a configuration of a display form change region is explained with reference to FIG. 7.

Figure 7:
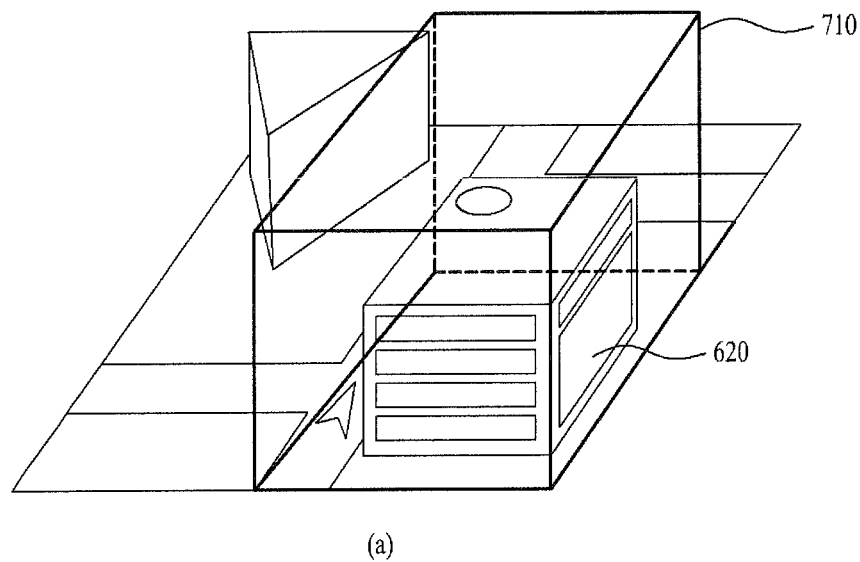
FIG. 7 is a diagram for one example of a change region polyhedron form displayed if a prescribed region of a 3D user interface displayed on a mobile terminal according to one embodiment of the present invention is designated to a display state change region.
Figure 7:
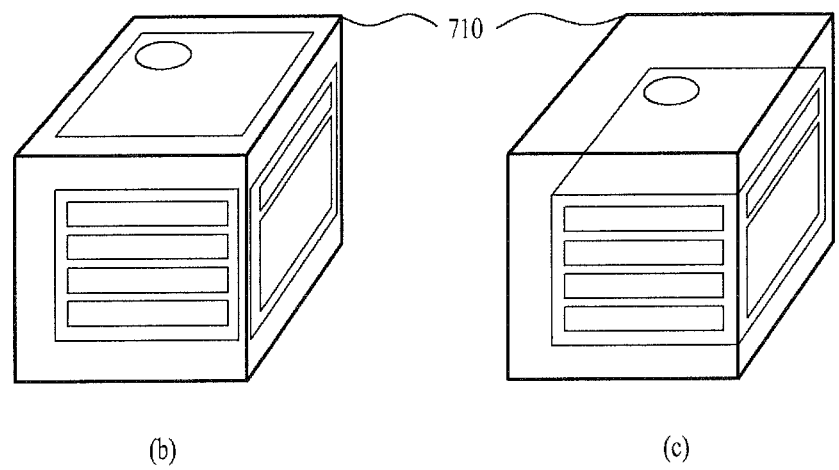

FIG. 7 is a diagram for one example of a change region polyhedron form displayed if a prescribed region of a 3D user interface displayed on a mobile terminal according to one embodiment of the present invention is designated to a display state change region.

Referring to FIG. 7, assume a case that a display state change region is designated by a prescribed method while such a 3D user interface as shown in FIG. 6 (*b*) is displayed.

First of all, a display form change region 710 can be designated as a cube form including a rectangular pillar type building 620 [FIG. 7 (*a*)].

If the display form change region is designated, a change region polyhedron (e.g., a cube form) can be displayed as shown in FIG. 7 (*b*) or FIG. 7 (*c*). In particular, referring to FIG. 7 (*b*), an image of a front view of a corresponding facet can be displayed on each facet of the change region polyhedron. Referring to FIG. 7 (*c*), an image of a prescribed region of the chance region polyhedron seen in the same view of viewing the 3D user interface can be displayed on each facet of the change region polyhedron.

In the following description, a method of designating a display state change region is explained with reference to FIG. 8.

Figure 8:
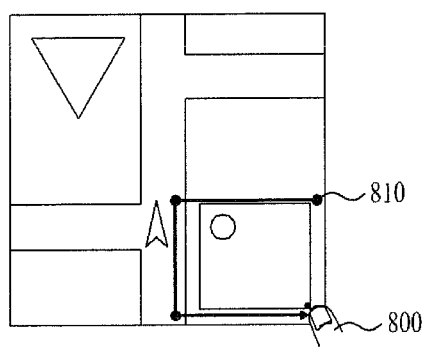
FIG. 8 is a diagram for one example of a method of designating a display state change region to a 3D user interface according to one embodiment of the present invention.
Figure 8:
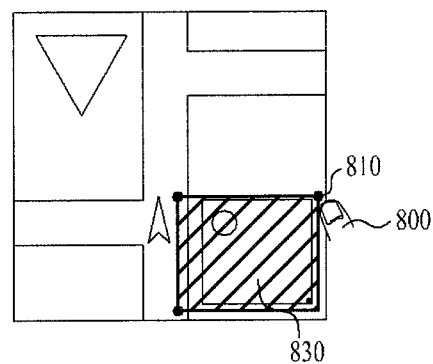
Figure 8:
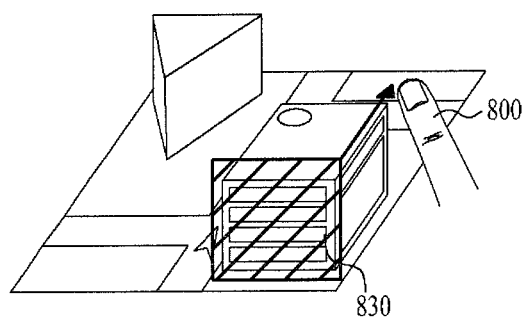
Figure 8:
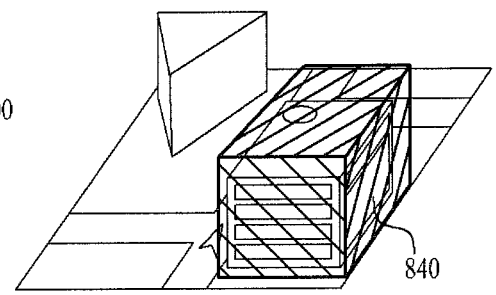

FIG. 8 is a diagram for one example of a method of designating a display state change region to a 3D user interface according to one embodiment of the present invention.

Referring to FIG. 8, assume that the display unit 151 includes a touchscreen configured to recognize a user's touch input. Assume that the display state change region is selected in a following manner. First of all, a display state change region is a polygonal pillar type. Secondly, after a polygon becoming a base side of a polygonal pillar has been designated, a height is given to the designated polygon.

Before a 3D user interface is activated as shown in FIG. 6 (*a*), it is able to use a method of selecting a polygon, which starts from a start point 810 and then returns to the start point, by a drag input via a pointer 800 [FIG. 8 (*a*)]. In this case, a contour line of the polygon can be displayed along a trace of the drag input on the display unit by having a prescribed visual effect given thereto.

Once the pointer 800 arrives at the start point 810 of the drag input, a prescribed visual effect 830 can be given to the selected polygon [FIG. 8 (b)]. In this case, as mentioned in the foregoing assumption, the selected polygon can become the base side of the display state change .region. In particular, by giving a preset height or a user selected height to a corresponding polygon, a polygonal pillar having its base side set to the corresponding polygon can be designated to the display state change region.

Meanwhile, if the 3D user interface is already activated, a polygon 830, which becomes a base side of a polygonal pillar corresponding to a display state change region, is first designated and a pointer 800 is then dragged to designate a height of the polygonal pillar [FIG. 8 (*c*)].

Hence, it is able to select such a display state change region 840 as shown in FIG. 8 (*d*).

In the aforesaid display state change region designating method, the step of drawing a polygon using a drag input can be replaced by a step of touching apexes of a polygon of the same shape in turn. In doing so, it is able to change a form and/or size of the polygon in a manner of dragging one of the apexes of the polygon.

Alternatively, if a specific 3D object is selected, a polyhedron including all corresponding objects can be directly selected as a display state change region. For instance, if the rectangular pillar type building 620 is touched in FIG. 7 (*a*), a virtual space corresponding to (or greater by a prescribed ratio than) a specific building in a 3D user interface can be designated to the display state change region.

In the following description, a process for displaying a selected display state change region as a change region polyhedron is explained with reference to FIG. 9.

Figure 9:
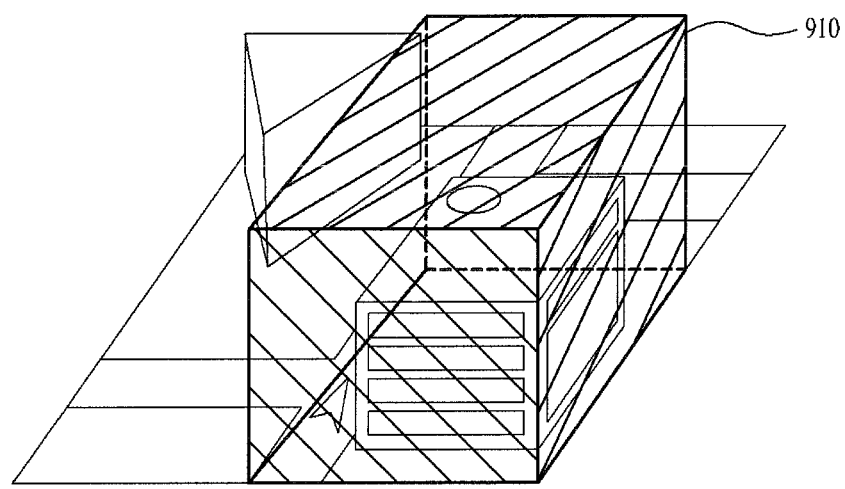
FIG. 9 is a diagram for one example of a form of displaying a change region polyhedron on a 3D user interface in a mobile terminal according to one embodiment of the present invention.
Figure 9:
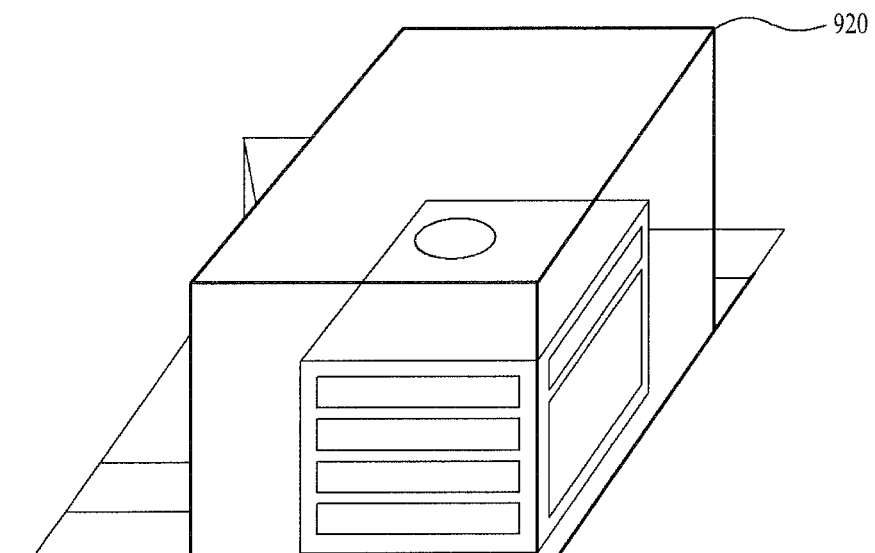

FIG. 9 is a diagram for one example of a form of displaying a change region polyhedron on a 3D user interface in a mobile terminal according to one embodiment of the present invention.

Referring to FIG. 9, if a display state change region 910 is selected from a 3D user interface [FIG. 9 (a)], a change region polyhedron 920 of a form generated from enlarging the display state change region at a prescribed ratio can be displayed in a manner of being overlaid on the 3D user interface [FIG. 9 (b)]. In doing so, a 3D depth lower than the previously displayed 3D user interface can be given to the change region polyhedron (i.e., the change region polyhedron looks as if located closer to a user than the 3D user interface). Moreover, the change region polyhedron 920 can be displayed in a manner of being enlarged larger than the selected display state change region 910.

Alternatively, the change region polyhedron can be displayed as a separate region or window on the display unit 151 in a manner of having a transparent effect given thereto or avoiding being overlapped with the 3D user interface as well as being displayed by being overlaid on the 3D user interface.

In the following description, a detailed form of changing a display state of a change region polyhedron by manipulating the displayed change region polyhedron is explained with reference to FIGS. 10 to 14.

In the following drawings including FIG. 10, a change region polyhedron, which is generated using a display state change region selected from a random 3D user interface by one of the aforesaid methods, is displayed as a cube (i.e., hexahedron). For clarity of the following description, a different schematic diagram is displayed on each facet of the cube for the purpose of discrimination.

Figure 10:
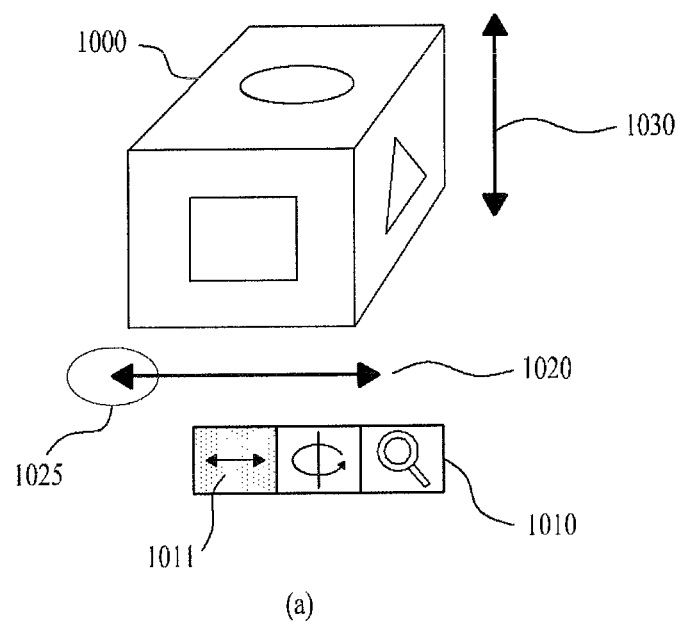
FIG. 10 is a diagram for one example of a method of scrolling a change region polyhedron in a mobile terminal according to one embodiment of the present invention.
Figure 10:
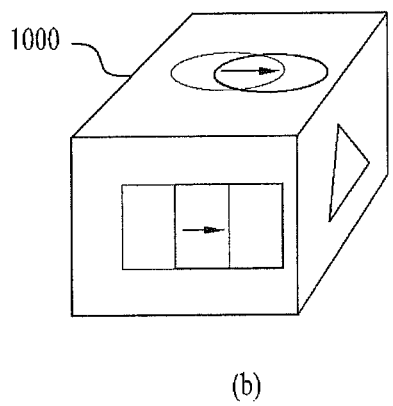

FIG. 10 is a diagram for one example of a method of scrolling a change region polyhedron in a mobile terminal according to one embodiment of the present invention.

Referring to FIG. 10 (*a*), a change region polyhedron 1000 of a cube type is displayed. When the change region polyhedron 1000 is displayed, an icon box 1010 for changing a display state of the change region polyhedron can be displayed as default automatically according to a setting. Alternatively, the icon box 1010 can be displayed if a prescribed command is inputted by a user via the user input unit 130.

In the icon box 1010 for changing the display state, a scroll mode icon 1011, a rotate mode icon, an enlarge/reduce mode icon and the like can be included.

If the user selects the scroll mode icon 1011, a scroll key button 1020 for right and left scrolls and a scroll key button 1030 for top and bottom scrolls can be displayed in the vicinity of the change region polyhedron.

If the user manipulates the scroll key button 1025 corresponding to a left direction, referring to FIG. 10 (*b*), an image displayed on each facet of the change region polyhedron 1000 can be scrolled. In dong so, an image of the facet vertical to the scroll direction may not be scrollable.

In the following description, a method of rotating a change region polyhedron is explained with reference to FIG. 11.

Figure 11:
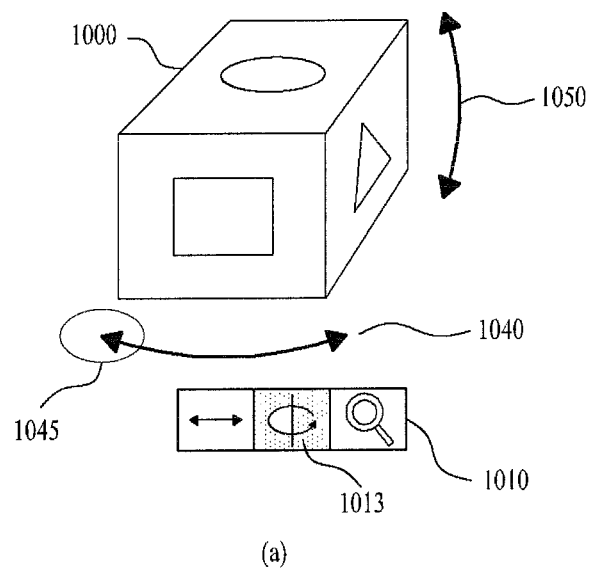
FIG. 11 is a diagram for one example of a method of rotating a change region polyhedron in a mobile terminal according to one embodiment of the present invention.
Figure 11:
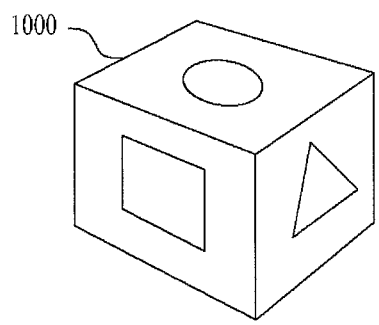

FIG. 11 is a diagram for one example of a method of rotating a change region polyhedron in a mobile terminal according to one embodiment of the present invention.

Referring to FIG. 11 (*a*), assume a case that the rotate mode icon 1013 in the icon box 1010 is selected in the situation similar to that shown in FIG. 10 (*a*). Hence, a horizontal scroll key button 1040 and a vertical scroll key button 1050 can be displayed in the vicinity of the change region polyhedron.

If a user manipulates a scroll key button 1045 corresponding to a horizontal clockwise direction, referring to FIG. 11 (*b*), it is able to rotate the change region polyhedron 1000 in the corresponding direction.

In the following description, a method of enlarging/reducing a change region polyhedron is explained with reference to FIG. 12.

Figure 12:
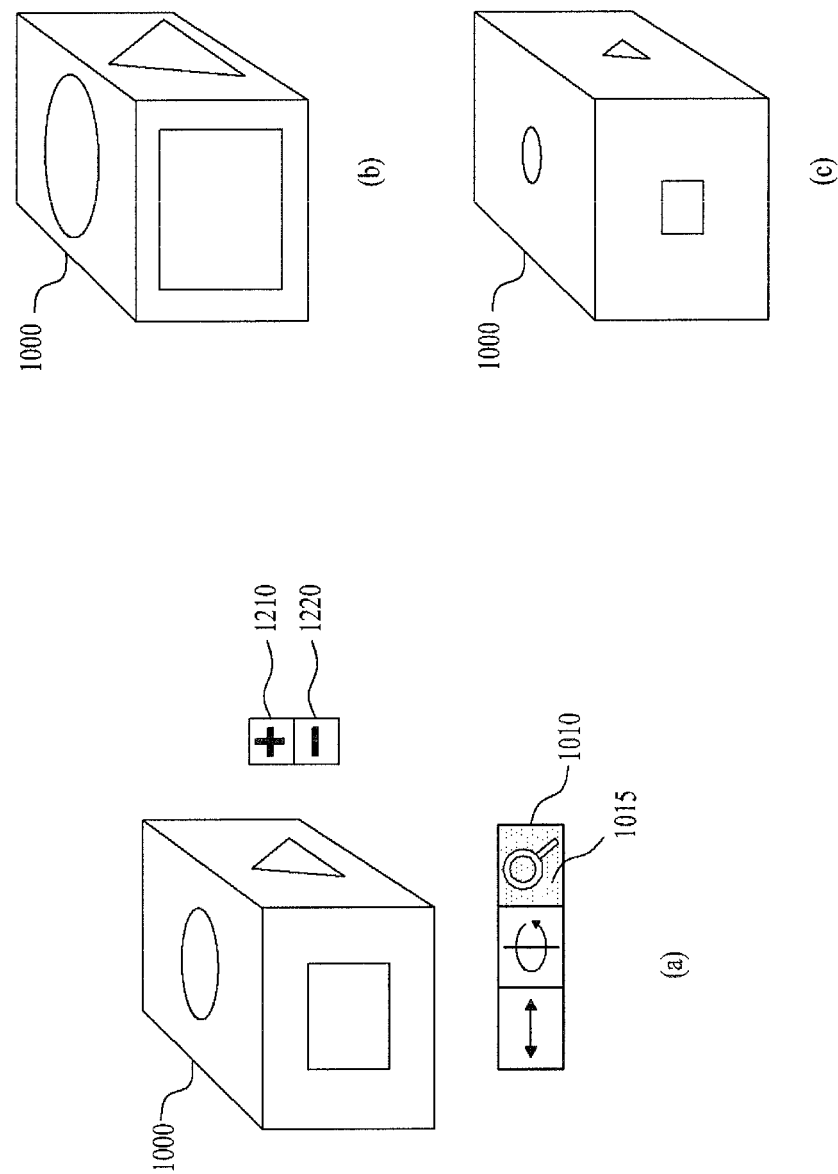
FIG. 12 is a diagram for one example of a method of enlarging/reducing a change region polyhedron in a mobile terminal according to one embodiment of the present invention.

FIG. 12 is a diagram for one example of a method of enlarging/reducing a change region polyhedron in a mobile terminal according to one embodiment of the present invention.

Referring to FIG. 12 (*a*), assume a case that the enlarge/reduce mode icon 1015 in the icon box 1010 is selected in the situation similar to that shown in FIG. 10 (*a*). Hence, an enlarge key button 1210 and a reduce key button 1220 can be displayed in the vicinity of the change region polyhedron.

If a user manipulates the enlarge key button 1210, referring to FIG. 12 (*b*), an image displayed on each facet of the change region polyhedron 1000 can be enlarged. If a user manipulates the reduce key button 1220, referring to FIG. 12 (*c*), an image displayed on each facet of the change region polyhedron 1000 can be reduced.

In the above described scrolling or enlarging/reducing method, the key button for performing each function preferably includes a virtual key button that can be manipulated via a touch input or a pointer by being displayed on the display unit. If the corresponding key button is not displayed on the display unit, it can be replaced by a prescribed hardware key button provided to the user input unit 130.

Meanwhile, in order to scroll or enlarge/reduce the change region polyhedron, it is able to use a touch input to the change region polyhedron instead of the key buttons described with reference to FIGS. 10 to 12. This is explained with reference to FIG. 13 as follows.

Figure 13:
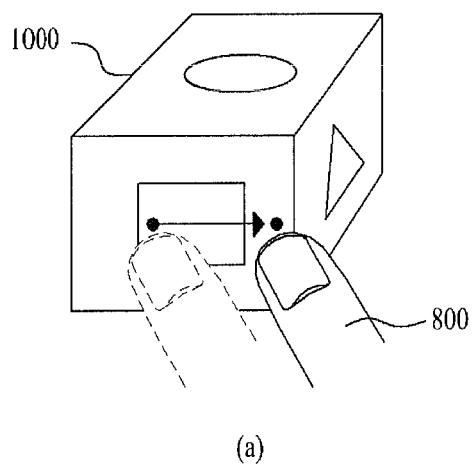
FIG. 13 is a diagram for one example of manipulating a change region polyhedron via a touch input in a mobile terminal according to one embodiment of the present invention.
Figure 13:
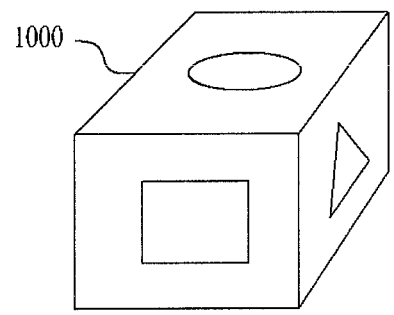
Figure 13:
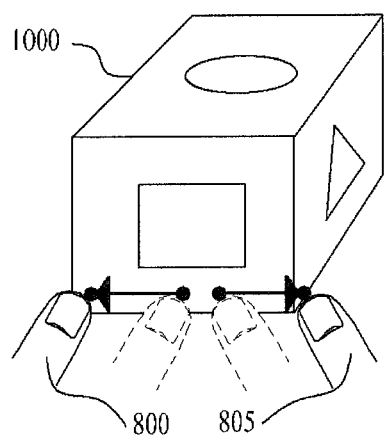
Figure 13:
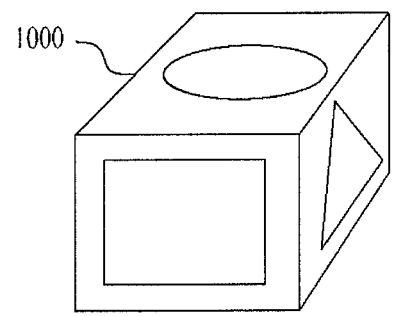

FIG. 13 is a diagram for one example of manipulating a change region polyhedron via a touch input in a mobile terminal according to one embodiment of the present invention.

Referring to FIG. 13, assume that the display unit 151, on which a change region polyhedron is displayed, includes a touchscreen.

Referring to FIG. 13 (*a*), a user performs a touch & drag input in a following manner to rotate a change region polyhedron [FIG. 13 (*b*)]. First of all, a user applies a touch input to one point on a change region polyhedron via a pointer 800, shifts the corresponding touch to another point by maintaining the touched state, and then releases the touch input.

Moreover, the user is able to enlarge an image displayed on each facet of the change region polyhedron [FIG. 13 (*d*)] by a method (i.e., multiple touch & drag) of simultaneously applying touch & drag inputs to the change region polyhedron using two pointers 800 and 805 set to get farther from initially touched points, respectively [FIG. 13 (*c*)]. In case that the touch & drag input is applied in a manner of getting closer to the initially touched point of each of the pointers, the image displayed on each facet of the change region polyhedron can be reduced.

Meanwhile, in another aspect of the present embodiment, it is able to enlarge one facet of a change region polyhedron again. This is explained with reference to FIG. 14 as follows.

Figure 14:
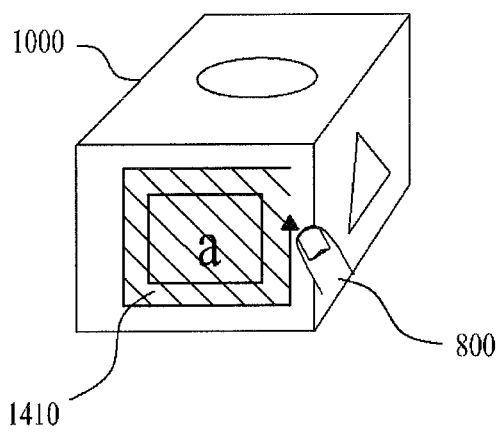
FIG. 14 is a diagram for one example of a method of enlarging and displaying one facet of a chance region polyhedron in a mobile terminal according to one embodiment of the present invention.
Figure 14:
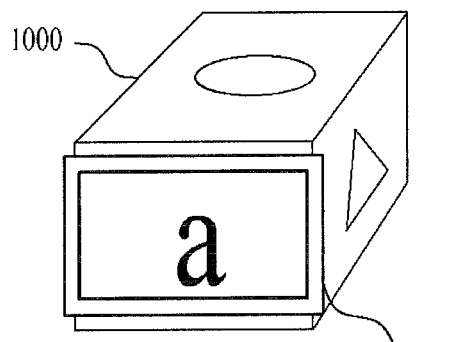

FIG. 14 is a diagram for one example of a method of enlarging and displaying one facet of a change region polyhedron in a mobile terminal according to one embodiment of the present invention.

Referring to FIG. 14, assume a following situation. First of all, a change region polyhedron is displayed on a touchscreen. Secondly, the aforesaid icon box 1010 is not activated. Thirdly, the aforesaid manipulation of the change region polyhedron using the touch, which is described with reference to FIG. 13, is not applicable.

Referring to FIG. 14 (*a*), when a change region polyhedron 1000 is displayed, it is able to designate a region 1410 to enlarge using a pointer 800 in order to enlarge an image displayed on a front facet of the change region polyhedron.

Accordingly, referring to FIG. 14 (*b*), it is able to display an image generated from enlarging the designated region at a prescribed ratio in a manner that a 3D depth lower than that of the change region polyhedron 1000 is given to the displayed image.

Besides, the aforesaid method of enlarging at least one portion of the facet can be combined with the aforesaid change region polyhedron manipulating method in various ways.

Plural Change Region Polyhedrons

Meanwhile, according to another embodiment of the present invention, at least two change region polyhedrons are selected and can be then simultaneously or selectively displayed. For this, a method of generating a plurality of change region polyhedrons and display form of the change region polyhedrons are described with reference to FIG. 15 and FIG. 16 as follows, respectively.

Figure 15:
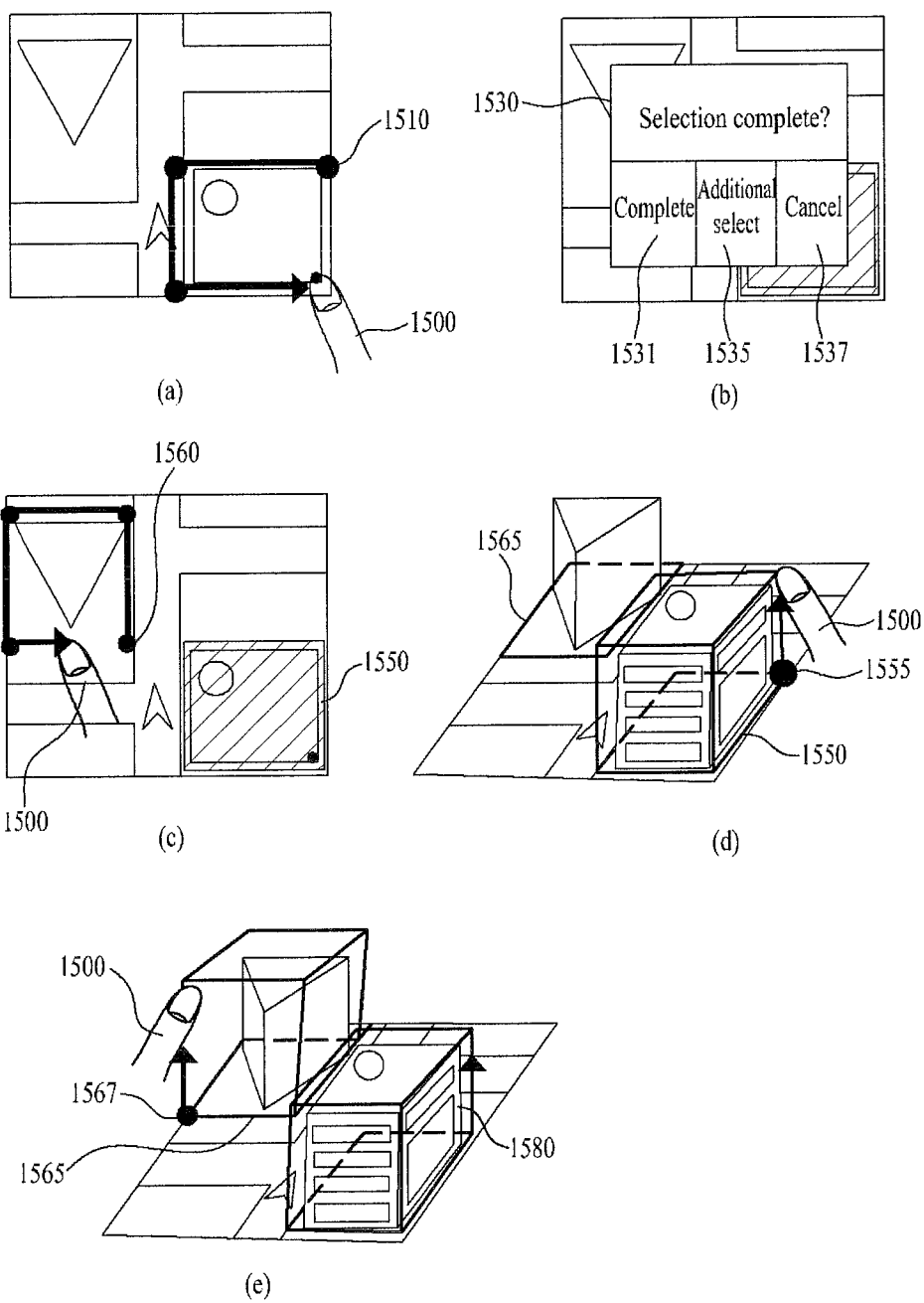
FIG. 15 is a diagram for one example of a method of selecting a plurality of display state change regions in a mobile terminal according to another embodiment of the present invention.

FIG. 15 is a diagram for one example of a method of selecting a plurality of display state change regions in a mobile terminal according to another embodiment of the present invention.

Referring to FIG. 15, assume the followings. First of all, the display unit 151 includes a touchscreen configured to recognize a user's touch input. Secondly, a display state change region has a cube form. Thirdly, the display state change region is selected in a manner of designating a rectangle becoming a base side of the cube and then giving a height to the designated base side. Fourthly, a 3D user interface displayed on a touchscreen is an application for informing a user of such perimeter location information a shown in FIG. 6.

Referring to FIG. 15 (*a*), in order to designate a display state change region of a cube type to a 2D map, a user performs a drag input with a trace 1510 corresponding to a base side of the cube around a rectangular pillar type building using a pointer 1500.

If the base side of the cube is specified (i.e., a closed loop is completed in a manner that a drag trace meets a start point), it is able to display a menu window 1530 for querying whether a selection of the cube base side is completed [FIG. 15 (*b*)]. In this case, the menu window 1530 includes a complete menu 1531 indicating a selection completion, an additional select menu 1531 indicating that another display state change region is additionally designated and a cancel menu 1537 for canceling a previous selection.

If the user selects the complete menu 1531, the routine goes to a step of determining a height from the selected base side (cf. FIG. 15 (*d*)). If the cancel menu 1537 is selected by the user, the routine goes back to the step shown in FIG. 15 (*a*).

If the user selects the additional select menu 1535, referring to FIG. 15 (*c*), the menu window 1530 disappears and a prescribed visual effect is given to the previously selected base side 1550. In this case, the user is able to select a base side of a second display state change region by performing a drag input in a manner of drawing a closed loop with a trace 1560 corresponding to a perimeter of a triangular pillar type building.

If the selection of the second base side is completed, the menu window 1530, as shown in FIG. 15 (*b*), is displayed again. In this case, assume that the user selects the complete menu 1531.

If the complete menu 1531 is selected, referring to FIG. 15 (*d*), the 2D map is switched to a 3D map and the base sides 1550 and 1565 selected in the previous steps are displayed. In this case, it is able to determine a height of the corresponding display state change region by a drag input starting with one point 1555 of the base side 1550 selected as the rectangular pillar type building perimeter. In particular, a release point of the drag & touch input becomes the height of the corresponding display state change region.

If the height determination is completed, a prescribed visual effect 1580 is given to indicate that the display state change region has been determined [FIG. 15 (*e*)]. And, a height of the second display state change region can be determined by a drag input starting with one point 1567 of the base side 1565 selected as the perimeter of the triangular pillar type building.

FIG. 15 shows the method of selecting two display state change regions simultaneously, by which the present invention is non-limited. For example, after one display state change region has been selected, another display state change region can be selected additionally from the step shown in FIG. 15 (*c*) by a prescribed menu manipulation.

FIG. 15 shows how two display state change regions are selected, by which the present invention is non-limited. For example, it is apparent to those skilled in the art that more display state change regions should be selectable.

In the following description a form of displaying a change region polyhedron and method of changing a display state of the change region polyhedron are explained with reference to FIG. 16.

Figure 16:
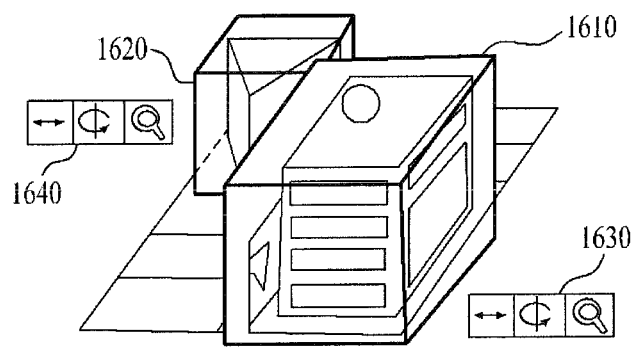
FIG. 16 is a diagram for one example of a form of displaying a plurality of change region polyhedrons in a mobile terminal according to another embodiment of the present invention.
Figure 16:
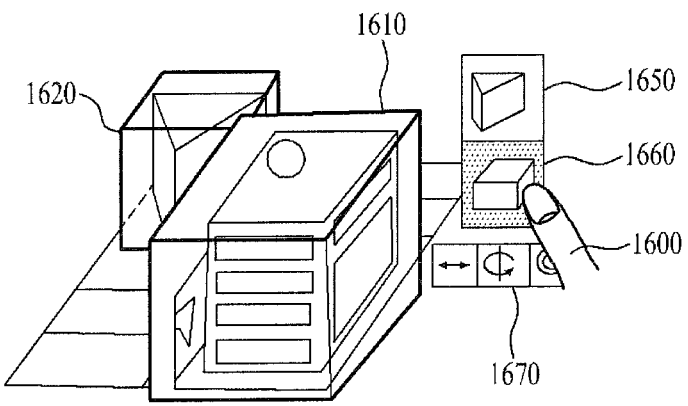
Figure 16:
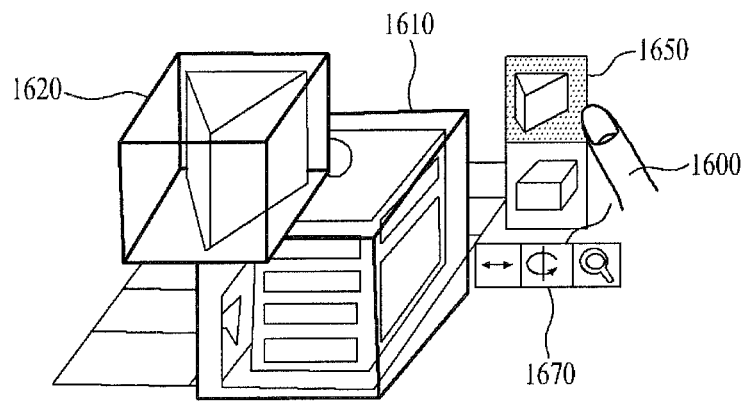

FIG. 16 is a diagram for one example of a form of displaying a plurality of change region polyhedrons in a mobile terminal according to another embodiment of the present invention.

Referring to FIG. 16, assume a situation after completion of the steps shown in FIG. 15.

Referring to FIG. 16 (*a*), two display state change regions are changed and displayed as change region polyhedrons 1610 and 1620, respectively. As mentioned in the foregoing description with reference to FIG. 9 (*b*), a prescribed visual effect can be given to each of the change region polyhedrons. Moreover, as mentioned in the foregoing description with reference to FIGS. 10 to 12, the icon boxes 1630 and 1640 are displayed in the vicinity of the change region polyhedrons to change the display states of the polyhedrons, respectively. As the description of the icon box is similar to that of the former icon box, the redundant description shall be omitted from the following description for clarity. Besides, the former display state changing method described with reference to FIG. 13 and FIG. 14 are applicable as well.

Referring to FIG. 16 (*b*), a form of displaying the change region polyhedrons is similar to that shown in FIG. 16 (*a*). Yet, thumbnails 1650 and 1660 for the change region polyhedrons are additionally displayed. If a user selects the thumbnail 1660 corresponding to the change region polyhedron 1610 including the rectangular pillar type building using a pointer 1600, a prescribed visual effect can be given to the selected thumbnail 1660 to indicate the corresponding selection. Afterwards, the user is able to change the display state of the selected change region polyhedron 1610 via an icon box 1670 displayed in the vicinity of the corresponding thumbnail 1660.

In this case, referring to FIG. 16 (c), if the user selects the thumbnail 1650 corresponding to the change region polyhedron 1620 including the triangular pillar type building, the change region polyhedron 1620 including the triangular pillar type building blocked by the change region polyhedron 1610 including the rectangular pillar type building is displayed on a highest level. In doing so, if each polyhedron is displayed as a 3D stereoscopic image, the 3D depth of the selected polyhedron is further lowered to enable the user to feel as if the selected polyhedron is closer to the user. Afterwards, if the user manipulates the icon box 1670, the controller 180 recognizes the manipulation as an input for changing the display state of the selected polyhedron 1620.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, the present invention is directed to a mobile terminal and controlling method thereof that substantially obviate one or more problems due to limitations and disadvantages of the related art.

An object of the present invention is to provide a mobile terminal and controlling method thereof, by which a more convenient 3D user interface3D user interface can be provided.

In particular, the present invention provides a mobile terminal and controlling method thereof, by which a display state of a designated region can be conveniently changed in a manner of designating a prescribed region to a stereoscopic user object including a 3D object positioned in a virtual 3D space.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a user input unit configured to receive an input of a command from a user, a display unit configured to display a 3D user interface3D user interface for arranging at least one 3D object having a prescribed 3D depth in a virtual stereoscopic space, and a controller, if at least one partial stereoscopic region is selected from the 3D user interface3D user interface according to a first input via the user input unit, controlling a polyhedron including the selected stereoscopic region to be displayed on the display unit, the controller controlling a display state of the polyhedron to be changed to correspond to a second input via the user input unit. In this case, a change of the display state includes at least one selected from the group consisting of enlargement, reduction, rotation and scroll of the polyhedron.

In another aspect of the present invention, a mobile terminal includes a touchscreen configured to display a 3D user interface3D user interface for arranging at least one 3D object as a prescribed form in a virtual stereoscopic space and a controller, if at least one stereoscopic region is selected from the 3D user interface3D user interface by a first input via the touchscreen, controlling at least one polyhedron corresponding to each of the selected at least one stereoscopic region to be displayed on the touchscreen, the controller controlling a display state of each of the at least one polyhedron to be changed to correspond to a second input via the touchscreen. In this case, a change of the display state includes at least one selected from the group consisting of enlargement, reduction, rotation and scroll of the polyhedron.

In another aspect of the present invention, a method of controlling a mobile terminal includes the steps of displaying a 3D user interface3D user interface including at least one 3D object on a display unit, selecting at least one stereoscopic region from the 3D user interface by a first input via a user input unit, displaying at least one polyhedron corresponding to each of the selected at least one stereoscopic region on the display unit, and changing a display state of each of the at least one polyhedron to correspond to a second input via the user input unit. In this case, the step of changing the display state is performed to enlarge, reduce, rotate or scroll the at least one polyhedron according to the second input.

Accordingly, the present invention provides the following effects and/or advantages.

First of all, a user is facilitated to manipulate a mobile terminal according to at least one embodiment of the present invention using a 3D user interface.

Secondly, the present invention facilitates a user to change a display state of a 3D user interface including a 3D object positioned in a 3D space.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a user input unit to receive inputs;
a display unit to display a perceived 3-Dimensional (3D) user interface for arranging at least one 3D object on a 3D space; and
a controller to control the display unit such that when a user-determined 3D polyhedral space is selected from the displayed 3D user interface based on a first input received via the user input unit, the controller controls the display unit to display a polyhedron that includes the user-determined 3D polyhedral space, and the controller to change a display state of the displayed polyhedron based on a second input received via the user input unit,
wherein the controller changes the display state of the polyhedron by enlarging, reducing, rotating or scrolling the displayed polyhedron,
wherein the perceived 3-Dimensional (3D) user interface includes a map application, and each of the at least one 3D object corresponds to a geographical object,
wherein the first input includes a first drag input for determining a region corresponding to a base side of the at least one 3D polyhedral space and a second drag input, after the first drag input is released, for determining a height of the at least one user-determined 3D polyhedral space having the base side,
wherein the base side of the at least one 3D polyhedral space includes a polygon and the first drag input is for determining the polygon, which starts from a start point and then returns to the start point; and
wherein the controller controls the display unit to display a menu window for receiving a confirmation of a presence or a non-presence of completion of the first drag input, and wherein in response to receiving an input via the menu window indicating the completion of the first drag input, the controller recognizes a next drag input as the second drag input.

2. The mobile terminal of claim 1, wherein the controller controls the display unit to display the polyhedron as an on screen display (OSD) on the 3D user interface by enlarging the polyhedron.

3. The mobile terminal of claim 1, wherein in response to the selection of one facet of the polyhedron based on a third input from the user input unit, the controller controls the display unit to enlarge a region corresponding to the selected facet.

4. The mobile terminal of claim 1, wherein the polyhedron is displayed as a perceived 3D image while the 3D user interface is displayed.

5. The mobile terminal of claim 1, wherein the user-determined 3D polyhedral space is selected based on a first input that includes a first selection input for determining a base side of the polyhedron and a second selection input, subsequent to the first selection input, for determining a height of the polyhedron.

6. A mobile terminal comprising:
a touchscreen to display a perceived 3-Dimensional (3D) user interface for providing at least one 3D object on a 3D space, the touchscreen to receive at least a first input and a second input; and
a controller to select a user-determined 3D polyhedral space from the displayed 3D space based on the first input, the controller to display at least one polyhedron corresponding to the user-determined 3D polyhedral space, and the controller to change a display state of the at least one polyhedron in response to the second input received via the touchscreen,
wherein the controller changes the display state of the at least one polyhedron by enlarging, reducing, rotating or scrolling the at least one polyhedron,
wherein the perceived 3-Dimensional (3D ) user interface includes a map application, and each of the at least one 3D object corresponds to a geographical object,
wherein the first input received via the touchscreen includes a first drag input for determining a region corresponding to a base side of the user-determined 3D polyhedral space and a second drag input, after the first input is released, for determining a height of the user-determined 3D polyhedral space having the base side,
wherein the base side of the 3D polyhedral space includes a polygon and the first drag input is for determining the polygon, which starts from a start point and then returns to the start point, and
wherein the controller controls the touchscreen to display a menu window for receiving a confirmation of a presence or a non-presence of completion of the first drag input, and wherein in response to receiving an input via the menu window indicating the completion of the first drag input, the controller recognizes a next drag input as the second drag input.

7. The mobile terminal of claim 6, wherein the controller displays two polyhedrons on the touchscreen, and the controller controls the touchscreen to provide a same perceived 3D depth or a different perceived 3D depth to each of the two polyhedrons.

8. The mobile terminal of claim 6, wherein the touchscreen displays at least one icon corresponding to one of a rotation, a parallel shift, an enlargement or a reduction, and wherein when the at least one icon is selected, the controller recognizes that the second input is received and changes the display state of the at least one polyhedron based on the selected icon.

9. The mobile terminal of claim 6, wherein the touchscreen displays at least one thumbnail corresponding to each displayed polyhedron.

10. The mobile terminal of claim 9, wherein in response to receiving an input via the touchscreen regarding selection of the at least one thumbnail, the controller changes the display state of the polyhedron corresponding to the selected thumbnail.

11. The mobile terminal of claim 6, wherein the user-determined 3D polyhedral space is selected based on a first input that includes a first selection input for determining a base side of the polyhedron and a second selection input, subsequent to the first selection input, for determining a height of the polyhedron.

12. A method of controlling a mobile terminal, the method comprising:
displaying, on a display unit, a perceived 3-Dimensional (3D ) user interface that includes at least one 3D object on a 3D space;
determining at least one user-determined 3D polyhedral space of the displayed 3D space based on a first input;

displaying, on the display unit, at least one polyhedron corresponding to the determined at least one user-determined 3D polyhedral space; and changing a display state of the at least one polyhedron based on a second input, wherein changing the display state includes enlarging, reducing, rotating or scrolling the displayed at least one polyhedron, wherein the perceived 3-Dimensional (3D) user interface includes a map application, and each of the at least one 3D object corresponds to a geographical object, wherein the first input includes a first drag input for determining a region corresponding to a base side of the at least one 3D polyhedral space and a second drag input, after the first drag input is released, for determining a height of the at least one user- determined 3D polyhedral space having the base side, and wherein the base side of the at least one 3D polyhedral space includes a polygon and the first drag input is for determining the polygon, which starts from a start point and then returns to the start point, and displaying a menu window for receiving a confirmation of a presence or a non-presence of completion of the first drag input, and wherein in response to receiving an input via the menu window indicating the completion of the first drag input, a next drag input is recognized as the second drag input.

13. The method of claim 12, further comprising:

displaying, on the display unit, at least one icon corresponding to one of a rotation, a parallel shift, an enlargement or a reduction, and in response to determining the selection of the at least one icon, changing the display state of the at least one polyhedron based on the selected at least one icon.

14. The method of claim 12, further comprising displaying at least one thumbnail corresponding to each displayed polyhedron.

15. The method of claim 14, further comprising determining an input regarding selection of the at least one thumbnail, and wherein changing the display state of the at least one polyhedron is based on the selected thumbnail.

16. The mobile terminal of claim 12, wherein the user-determined 3D polyhedral space is selected based on a first input that includes a first selection input for determining a base side of the polyhedron and a second selection input, subsequent to the first selection input, for determining a height of the polyhedron.

17. A mobile terminal comprising:

a display to display a perceived 3-Dimensional (3D) user interface and at least one 3D object on a 3D space, wherein the perceived 3-Dimensional (3D) user interface includes a map application, and each of the at least one 3D object corresponds to a geographical object; and a controller to determine a user-determined 3D polyhedral space of the displayed 3D space based on a first input, the controller to control the display to display a polyhedron that includes the user-determined 3D polyhedral space, the controller to enlarge the displayed polyhedron based on a second input, and the controller to further change the displayed polyhedron based on a third input, wherein the first input includes a first drag input for determining a region corresponding to a base side of the 3D polyhedral space and a second drag input, after the first drag input is released, for determining a height of the 3D polyhedral space having the base side, wherein the base side of the 3D polyhedral space includes a polygon and the first drag input is for determining the polygon, which starts from a start point and then returns to the start point, and wherein the controller controls the display to display a menu window for receiving a confirmation of a presence or a non-presence of completion of the first drag input, and wherein in response to receiving an input via the menu window indicating the completion of the first drag input, the controller recognizes a next drag input as the second drag input.

18. The mobile terminal of claim 17, wherein the third input corresponds to enlarging, reducing, rotating or scrolling the displayed polyhedron.

19. The mobile terminal of claim 17, wherein the display displays an icon corresponding to a visual effect, and wherein when the at least one icon is selected, the controller recognizes that the third input is received and changes the at least one polyhedron based on the selected icon.

20. The mobile terminal of claim 17, wherein the user-determined 3D polyhedral space is selected based on a first input that includes a first selection input for determining a base side of the polyhedron and a second selection input, subsequent to the first selection input, for determining a height of the polyhedron.

* * * * *